US008585276B2

(12) United States Patent
Fenton

(10) Patent No.: US 8,585,276 B2
(45) Date of Patent: Nov. 19, 2013

(54) AUTOMATED FOOD MIXER CLEANING SYSTEM

(75) Inventor: Richard Stanley Michael Fenton, Christchurch (NZ)

(73) Assignee: The Trustees of the La Strada No. 2 Trust, Christchurch (NZ)

( * ) Notice: Subject to any disclaimer, the term of this patent is extended or adjusted under 35 U.S.C. 154(b) by 761 days.

(21) Appl. No.: 12/680,166

(22) PCT Filed: Sep. 25, 2008

(86) PCT No.: PCT/NZ2008/000252
§ 371 (c)(1),
(2), (4) Date: Jul. 2, 2010

(87) PCT Pub. No.: WO2009/041835
PCT Pub. Date: Apr. 2, 2009

(65) Prior Publication Data
US 2010/0265787 A1    Oct. 21, 2010

(30) Foreign Application Priority Data

Sep. 25, 2007 (NZ) ........................................ 561933

(51) Int. Cl.
B01F 15/00 (2006.01)
B08B 9/00 (2006.01)
B08B 9/08 (2006.01)
B05B 3/00 (2006.01)

(52) U.S. Cl.
USPC ..................... 366/138; 366/167.1; 366/167.2; 134/167 R; 134/172; 134/181; 134/198; 239/246; 239/248; 239/264; 239/554; 239/558; 239/559; 239/587

(58) Field of Classification Search
None
See application file for complete search history.

(56) References Cited

U.S. PATENT DOCUMENTS

| | | | |
|---|---|---|---|
| 3,741,808 A | 6/1973 | Stalker | |
| 3,791,583 A | 2/1974 | Nunlist et al. | |
| 3,802,447 A | 4/1974 | Bender | |
| 3,874,594 A | 4/1975 | Hatley | |
| 4,082,057 A | 4/1978 | Hayes | |
| 4,241,744 A | 12/1980 | Jordan, Sr. | |
| 4,244,523 A * | 1/1981 | Looper | ......................... 239/227 |
| 4,646,768 A | 3/1987 | Tanaka et al. | |
| 4,690,159 A | 9/1987 | Vadakin et al. | |
| 4,859,249 A | 8/1989 | Valentini | |
| 5,782,985 A | 7/1998 | Manser et al. | |
| 2002/0069897 A1 | 6/2002 | Emrey | |
| 2006/0076041 A1 | 4/2006 | Geppert et al. | |

FOREIGN PATENT DOCUMENTS

DE        19601184 A1    7/1996
GB           828475       2/1960

OTHER PUBLICATIONS

International Preliminary Report on Patentability issued in PCT/NZ2008/000252, dated Dec. 15, 2008 (7 pages).
The Supplementary European Search Report and the Search Opinion dated Sep. 16, 2013, in European Patent Application No. 08833985.

* cited by examiner

*Primary Examiner* — Neil N Turk
(74) *Attorney, Agent, or Firm* — Hovey Williams LLP

(57) ABSTRACT

A cleaning system for cleaning the interior of an industrial food mixing bowl of, for example, a dough mixer includes a cleaning lance with a spray nozzle assembly at an end of the lance, an actuator operable to reciprocally insert and retract the lance into or out of a food mixer bowl, and a pump operable to deliver cleaning fluid under pressure over a conduit to the lance and spray nozzle assembly.

20 Claims, 4 Drawing Sheets

AUTOMATED FOOD MIXER CLEANING SYSTEM

This application is a National Stage of International Application PCT/NZ2008/000252 filed 25 Sep. 2008, which claims the benefit of U.S. Provisional Application No. 61/023,599, filed 25 Jan. 2008, and New Zealand Application No. 561933, filed 25 Sep. 2007, the entire disclosures of which are incorporated herein by reference.

FIELD OF THE INVENTION

The invention relates to cleaning systems for industrial food mixers.

BACKGROUND

A typical food mixer, such as a dough mixer for mixing or kneading dough used in food such as bread products, biscuits or pastry, has a mixing bowl, a mixing or kneading tool that is driven to rotate within the mixing bowl, and an electric motor for driving the mixing tool. In use the dry and liquid ingredients are added to the mixing bowl and the mixer operates to mix or knead the ingredients to form dough. On completion the dough is removed from the mixing bowl.

Typically there is residual dough mixture adhered to the interior of the mixing bowl after the dough has been removed. It is necessary to clean the interior of the mixing bowl and the mixing or kneading tool before the next use. Commonly the mixing bowl is cleaned manually to hand scrape excess dough from the interior of the mixing bowl. A quantity of water is then supplied into the mixing bowl from a hose for example, the mixing bowl lid is closed and the mixer is run for up to thirty minutes. The water and dough are then tipped from the mixing bowl. During cleaning the mixer is out of operation, decreasing the production output from the mixer. Alternatively it is known for the mixer operator to scrape and then wash out the mixing bowl by hand with a hose. The water and removed dough are tipped out of the mixing bowl ready for the next batch of dough ingredients.

Both the above require the mixer operator to lean over or climb into the interior of the mixing bowl, which risks personal injury. During both of the above the area around the mixing bowl becomes wet and slippery, also creating a risk of injury to the operator.

As increasingly a higher standard of cleaning is required, to minimise the risk of any allergen build-up that would otherwise pose a hazard to consumers, the time required to acceptably clean a mixing bowl is increasing. This further increases production plant downtime.

SUMMARY OF THE INVENTION

It is an object of the invention to provide an improved cleaning apparatus for a food mixer or at least provide the public with the useful alternative.

In broad terms the invention comprises a food mixer cleaning apparatus for cleaning the interior of a food mixing bowl comprising:
  a support structure for attachment to or attached to the exterior of a food mixer,
  an arm movably carried by said support structure,
  a cleaning lance carried by said arm,
  a spray nozzle assembly at an end of the lance,
  an actuator operable to reciprocally move the arm on the support structure to insert or retract the lance into or out of a food mixer bowl, and
  a pump operable to deliver cleaning fluid under pressure over a conduit to the lance and spray nozzle assembly.

In a preferred form the food mixer cleaning apparatus also comprises a flap and associated actuator to normally close an aperture into a food mixer bowl when the cleaning lance is retracted and operable to open the flap to allow insertion and retraction of the lance into and from the bowl through said aperture.

In a preferred form the food mixer cleaning apparatus also comprises a cover around another end of the cleaning lance to close an aperture into a food mixer bowl through which the lance is inserted into and retracted from the food mixer bowl.

In a preferred form the food mixer cleaning apparatus also comprises a control system arranged to on initiation of a cleaning cycle cause opening of said flap, insertion of the cleaning lance through into a food mixer bowl, and operation of a pump to deliver fluid under pressure to the spray nozzle assembly of the lance.

The invention also comprises a method of cleaning the interior of a food mixing bowl having a lid using a cleaning unit assembly comprising the steps of:
  connecting a pump to a fluid supply and a power outlet,
  activating an actuator to open a lid closure mechanism recessed in said lid and simultaneously insert a bowl cleaning assembly including a cleaning lance into the interior of said food mixing bowl,
  activating said pump to pump cleaning fluid under pressure into the food mixing bowl under pressure,
  activating said actuator on completion of a wash cycle to retract the cleaning unit assembly from the food mixing bowl and simultaneously closing said lid closure mechanism to a closed position.

The invention also includes a cleaning apparatus for cleaning the interior of a food mixing bowl including a lid comprising:
  at least one support frame for attachment to a food mixing bowl,
  a support arm slidingly engaged with said at least one support frame for supporting a bowl cleaning assembly, said bowl cleaning assembly including
    a substantially hollow elongate lance member attached to said support arm,
    a cleaning head assembly rotatably engaged with said substantially hollow elongate lance member and located at a first end of said substantially hollow elongate lance member opposite said support arm, and
    a conduit having a first end releasably connected to a second end of said substantially hollow elongate lance member,
  at least one actuator engaged with said at least one support frame and electrically connected to said support arm, said at least one actuator operable to slide said support arm in a substantially vertical direction along said at least one support frame to insert or retract said substantially hollow elongate lance member into or out of said food mixing bowl, and
  a pump releasably connected to a second end of said conduit, said pump operable to provide a fluid at a pressure to said substantially hollow elongate lance member via said conduit to deliver a high pressure fluid output from said cleaning head assembly to clean said food mixing bowl when said substantially hollow elongate lance member is inserted in said food mixing bowl.

The term "comprising" as used in the specification means "consisting at least in part of", that is to say when interpreting statements in this invention which include that term, the features prefaced by that term in each statement, or need to be present but other features can also be present.

BRIEF DESCRIPTION OF THE DRAWINGS

Preferred forms of the invention are described by way of example only and with reference to the accompanying drawings in which.

DETAILED DESCRIPTION OF PREFERRED FORM

Figure 1:
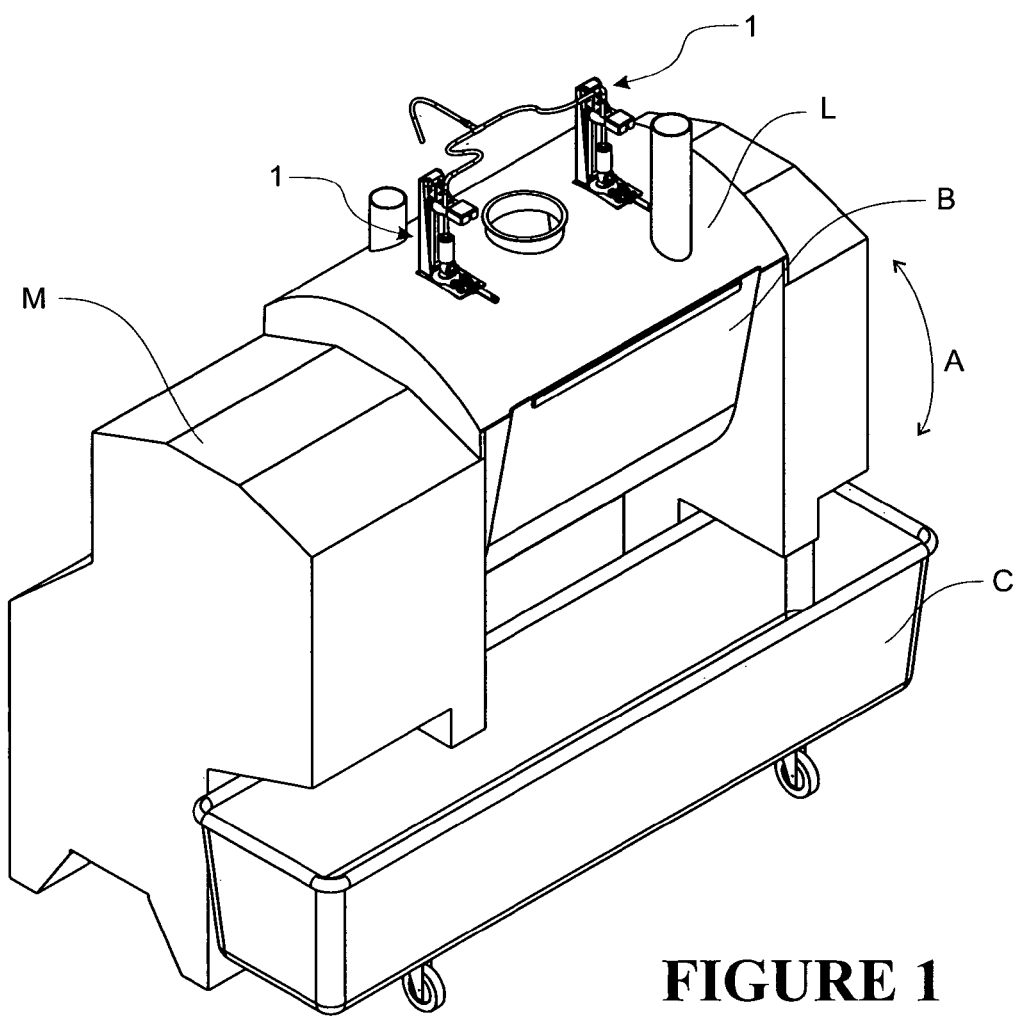
FIG. 1 is a perspective view of an industrial mixer comprising a twin lance cleaning system of the invention.

Referring initially to FIG. 1, an industrial food mixer includes a large mixing bowl B in which ingredients used to form bread, biscuit, or pastry dough are placed and mixed, and having a lid L. The mixer has a dough arm carrying a mixing or kneading tool (not shown) that in operation moves within the interior the mixing bowl B to mix ingredients in the mixing bowl. The dough arm and mixing tool are driven by an electric motor mounted under cover M, which typically in operation rotates the dough arm in a pattern around the interior of the mixing bowl. In the particular embodiment shown the mixing bowl B can pivot about a substantially horizontal axis as indicated by arrow A in FIG. 1, to tip the dough at the completion of mixing into trolley bucket C for carrying to the next production stage. The mixer thus far described is a conventional horizontal axis industrial dough mixer.

Figure 2:
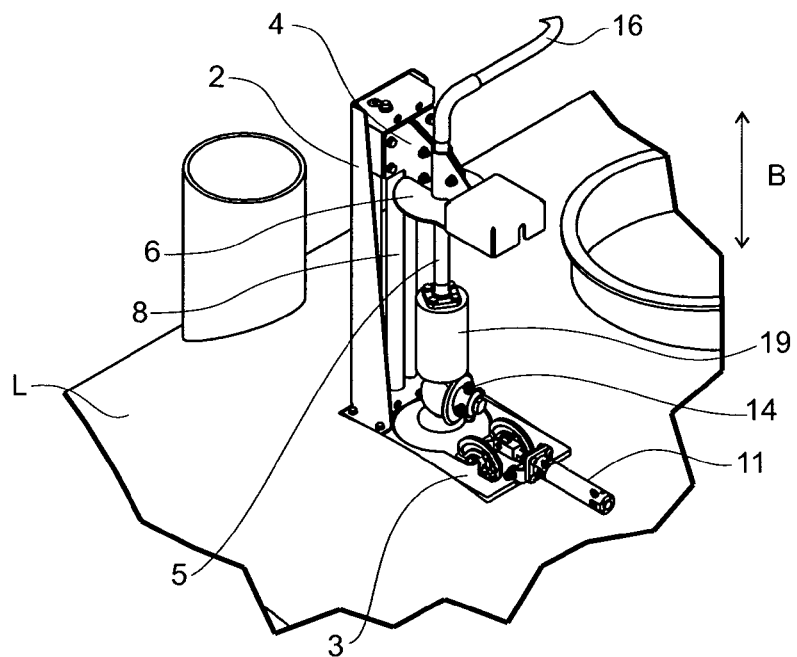
FIG. 2 is a view of one automated cleaning lance, retracted from the cleaning bowl.
Figure 3:
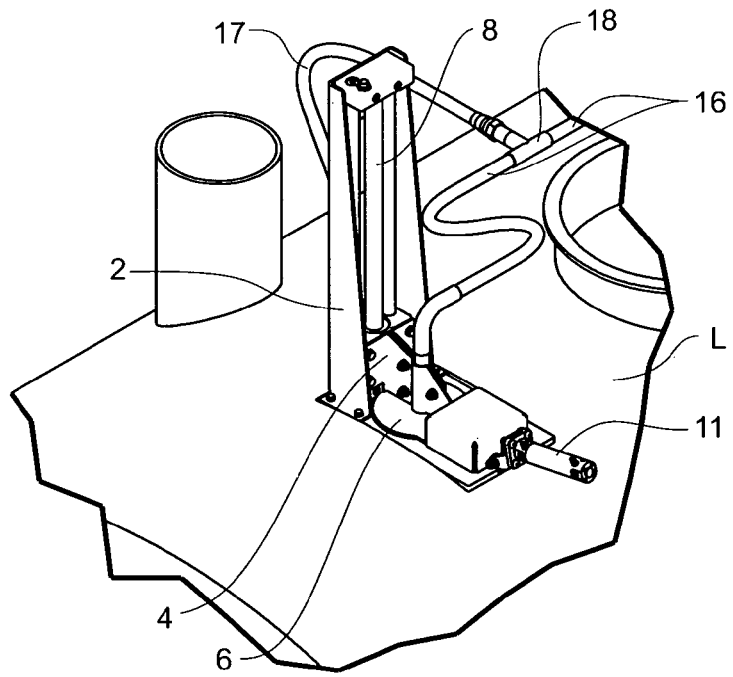
FIG. 3 is a view similar to that of FIG. 2 but showing the lance inserted into the cleaning bowl.

The mixer comprises an automated bowl cleaning system of the invention. The mixer shown in FIG. 1 comprises two cleaning lances mounted to the lid L of the mixer, each of which is normally retracted as shown but can be automatically inserted through a hatch into the interior of the mixing bowl for cleaning as will be further described, and then subsequently returned to the retracted position at the completion of cleaning. FIGS. 2 and 3 are views of one automated cleaning lance, showing the lance retracted from the cleaning bowl in FIG. 2 and inserted into the cleaning bowl in FIG. 3.

Figure 4:
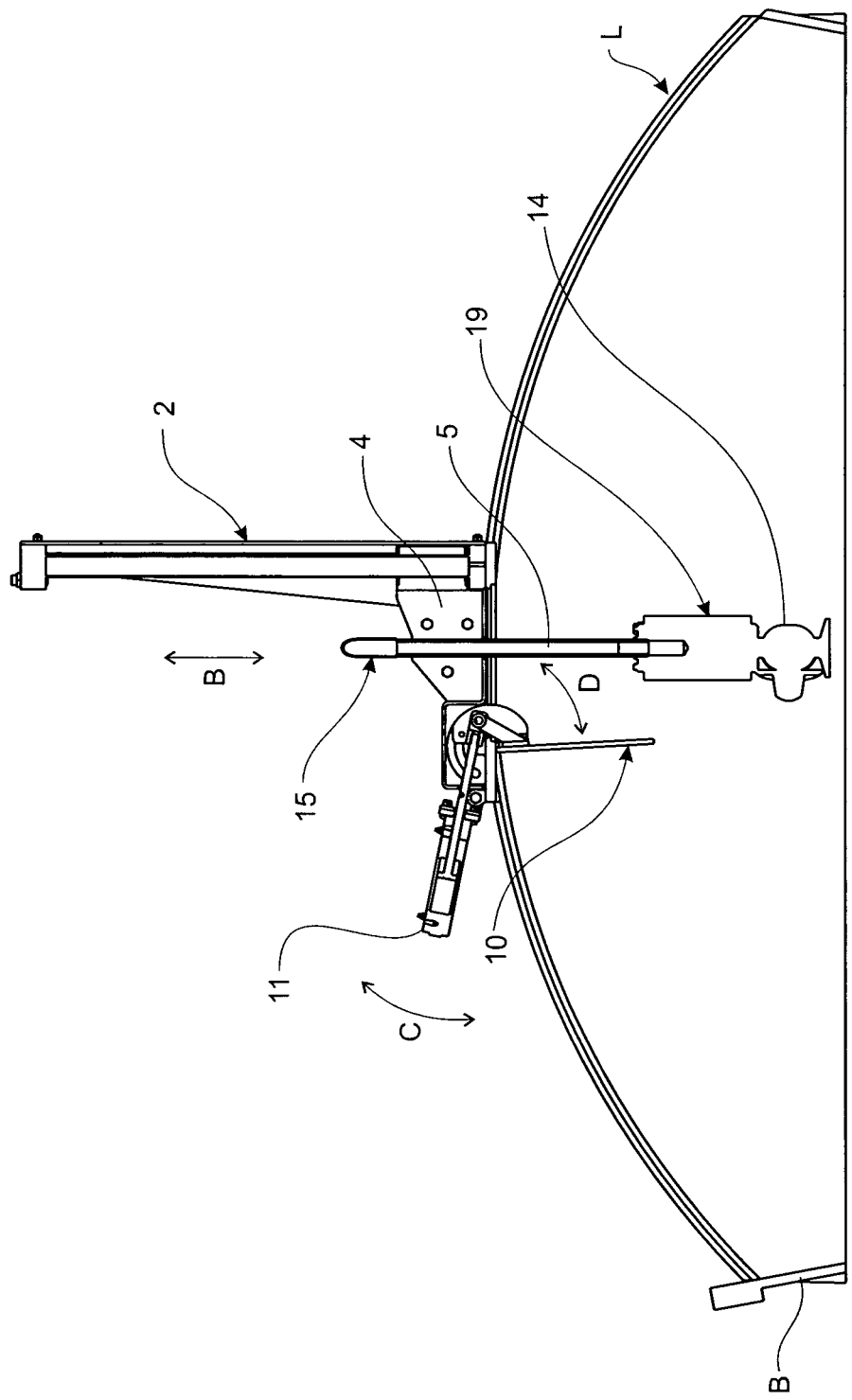
FIG. 4 is a schematic cross-section view through the lid of the mixer of FIG. 1 and upper part of the bowl of the mixer with a cleaning lance inserted into the mixer bowl as in FIG. 3.

Referring now particularly to FIGS. 2 to 4 each cleaning lance includes a support structure comprising a support post 2 fixed to the lid L of the mixer, and for example attached to a mounting plate 3, that is in turn fixed around an aperture through the mixing bowl lid. The support post 2 may be permanently fixed to the lid or removably fixed, via releasable latches between the mounting plate 3 and lid for example. An arm 4 is moveably carried by the support post 2 such that the arm 4 can move on the post, reciprocally in the direction of arrow B in FIGS. 2 and 4. Movement of the arm 4 on the support part 2 is driven by a linear actuator 8 mounted to the support post 2 such as an electro-pneumatic ram for example. The arm 4 in turn carries a hollow lance 5 and a cover 6 slightly larger in diameter than the aperture through the mixer lid, mounted around an upper end of the lance 5.

Also carried by the mounting plate 3 is a pivoting flap 10 that can move as indicated by arrow D in FIG. 4. In its normally closed position the flap 10 closes the aperture in the lid L of the mixing bowl from the underside or interior, and in the preferred form locates in a recess on the underside of the lid around the aperture through the lid to reduce dough built up around the flap 10 when a batch of dough is being mixed. The flap 10 can pivot to an open position shown in FIG. 4. The flap 10 is moved by a pivoting actuator 11 such as an electro-pneumatic actuator, that moves in the direction of arrow C in FIG. 4 and in the preferred form is also carried on the mounting plate 3. In use at the commencement of a cleaning cycle both the actuator 11 and the actuator 8 are activated simultaneously to open the flap 10 (move it to the position shown in FIG. 4) and insert the lance 5 through the aperture in the mixer lid L and into the interior of the mixing bowl, when a mixer operator initiates a wash cycle at a mixer control panel.

Figure 5:
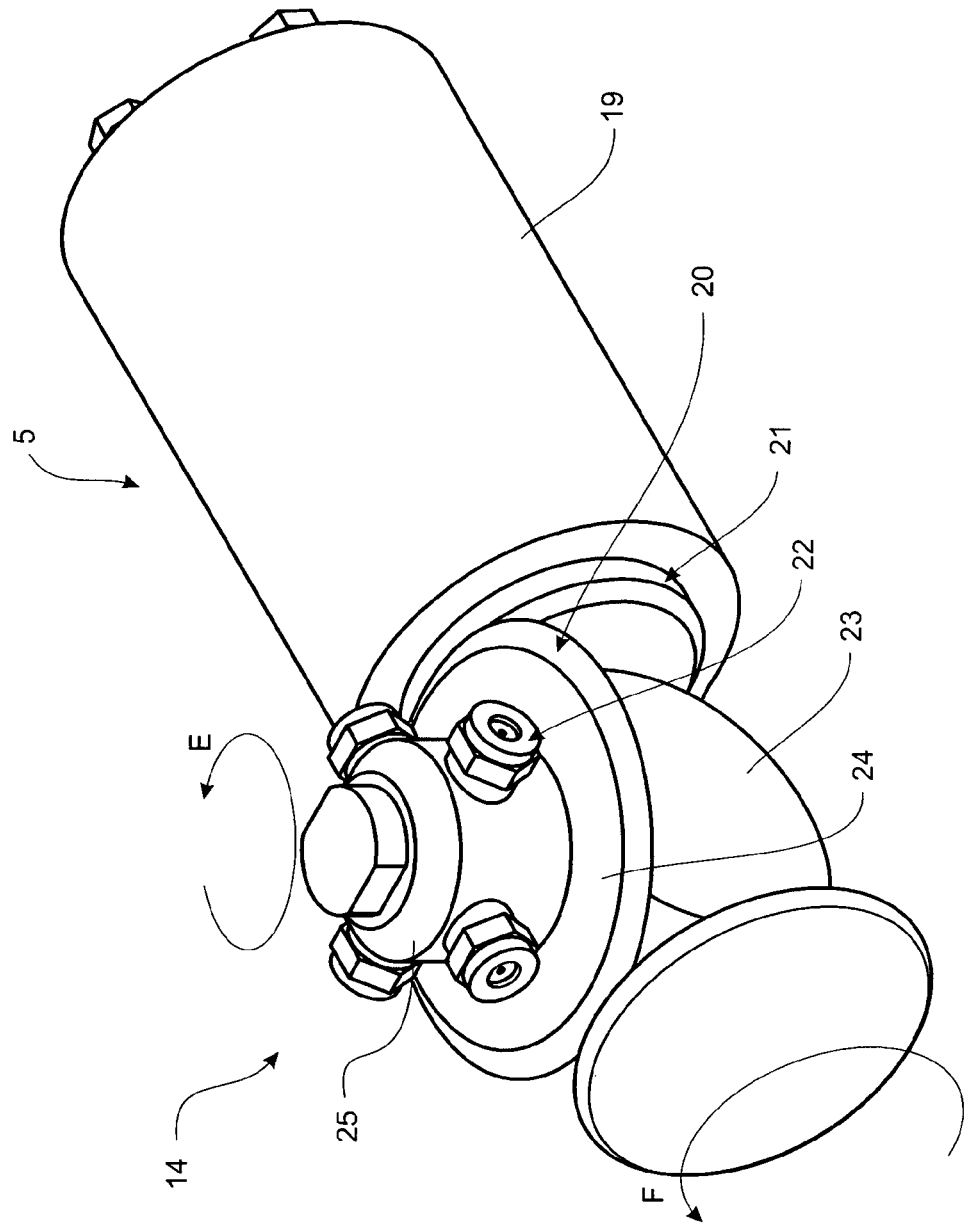
FIG. 5 is a view of a spray nozzle assembly of the preferred embodiment, at one end of the or each cleaning lance.

When in its extended or inserted position shown in FIGS. 3 and 4 the lance 5 extends into the interior of the mixing bowl, and located at the distal end of the lance 5 is a spray nozzle assembly 14 shown in FIG. 5 and comprising a number of nozzles 22, as will be further described. As the lance 5 moves into the interior of the mixing bowl, the cover 6 towards the upper and of the lance also moves towards the aperture in the mixer lid. The cover 6 is positioned such that when the arm 4 is in its lowermost position on the support post 2 (FIGS. 3 and 4) the cover 6 overlays and closes from above the aperture in the mixer lid. A sealing ring or similar may be provided on the underside of the cover 6 or the top of the mixer lid around the aperture, to ensure that when the cover 6 closes the aperture in the mixer lid a water tight seal is formed.

The lance 5 comprises a hollow tube. A connector 15, which may be of a quick release type, connects a flexible hose 16 to the other end of the lance 5 to in use deliver cleaning fluid to the lance. In the order to supply cleaning fluid simultaneously to the two cleaning lances 5 of the mixer shown in FIG. 1, each hose 16 is connected to a main feed hose 17 using a T-shaped connector 18.

FIG. 5 shows an individual spray nozzle assembly at the end of each lance and comprising spray nozzles 22. Cleaning water under pressure is delivered through the lance 5 to the spray head and causes the spray nozzles 22 to rotate, as indicated by arrow E about a first axis transverse to the length of the lance 5, and simultaneously as indicated by arrow F about an axis co-axial (or parallel) with that of the lance 5, so that the high pressure fluid flow from the nozzles 22 generates a substantially spherical high pressure spray from the end of the lance 5 within the interior of the mixer bowl, towards the walls and underside of the lid of the mixer bowl, to dislodge dough remaining sticking to the interior of the bowl and lid and clean the bowl and lid. Whilst it is preferable to provide four nozzles 22 as shown or more, less preferably may be provided two opposing nozzles 22 or a single nozzle. It is preferable that multiple nozzles 22 are spaced equidistant about the hollow housing 25.

In the particular form shown a pinion gear 20 is attached to a shaft 23, that inserts into the distal end 15 of the lance 5. The assembly includes a plate 24 having a bevel gear pinion 21 arrangement integral with the bottom of the plate 24 for engagement with the bevel gear 20. The bevelled gear and pinion arrangement 20, 21 enables the spray nozzle assembly 14 to rotate as indicated by the arrow E. Extending upwardly from the top surface of the plate 24 is a substantially hollow housing 25 having a central axis of rotation concentric with the plate central axis of rotation. The nozzles 22 are preferably perpendicular to the hollow housing 25 and preferably located around the circumference of the hollow housing 25.

A high pressure positive displacement cleaning fluid pump 41 is fixed to or integral with the mixer and may be operated via a mixer control panel integral with the mixing machine. The hose 16, 17 connect the pump to the lances 5 as described.

Figure 6:
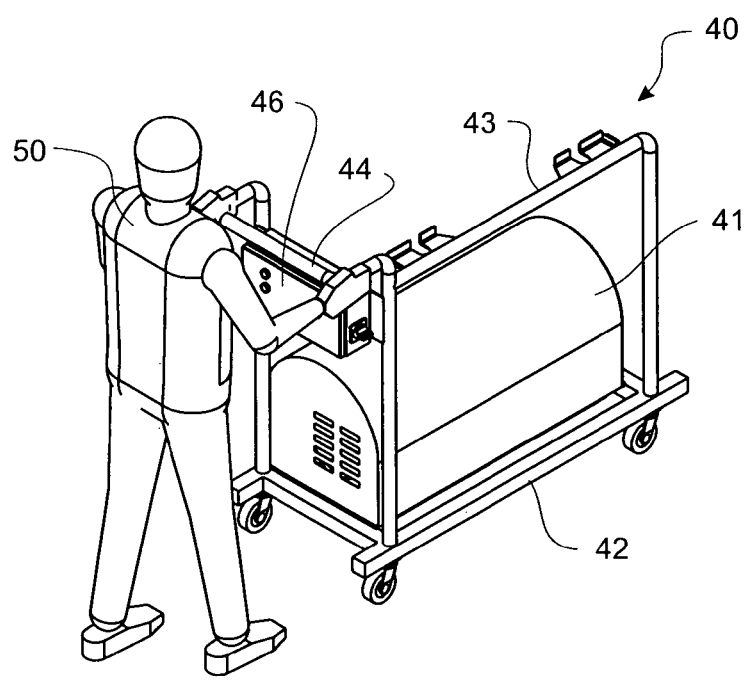
FIG. 6 is a view of a mobile high pressure pumping station for connection to a fixed lance cleaning assembly.

Alternatively, the lances 5 can be connected via hose 17 to a mobile pump trolley 40 shown in FIG. 6 having a pump 41 powered by a 3-phase motor on a moveable platform or pedestal 42. Extending upwards from the pedestal 42 is a support framework 43 with integral handle 44 used by an operator indicated at 50 to push the pump trolley 40 around the bakery area between mixers. Located below the handle 44 is a control panel 46 used by the operator 50 to set and control the operation of the pump 40 and the cleaning assembly wash cycle. Power is provided to the control panel 46 via a power supply cable that is connected to a power supply outlet integral with a mixer or alternatively connected to a nearby power outlet.

In use, when a mixing bowl is to be cleaned, the operator removes excessive dough within the mixing bowl before initiating a wash cycle using the mixer control panel to provide power to the pump 41, open the bowl drain in the bottom and integral with the mixing bowl, and activate the actuators 8 and 11 and to insert the lances 5 into the interior of the mixing bowl as described previously. Once cleaning is underway, the mixer operator is, free to undertake other work. When the wash cycle is completed the pump 41 stops and the lances 5 are retracted from the interior of the mixing bowl by the actuators 8, and the actuators 11 pivot the flaps 10 back to their closed position. The bowl drain is also automatically closed and a visual indication may be shown on the control panel to indicate that the wash cycle has completed.

More specifically, in a preferred embodiment once the dough making process has been completed and any excess dough has been removed from the mixing bowl, the mixer operator undertakes the following steps in order to clean the interior of the mixing bowl.

The operator initiates a mixing bowl wash cycle as described above.

The mixing bowl drain at the bottom of the mixing bowl automatically or manually opens to allow soiled cleaning fluid to be removed from the interior of the mixing bowl when the bowl is being cleaned.

The flap actuator(s) 11 is/are activated to open the flap(s) 10.

The actuator(s) 8 is/are activated to lower and insert the lance(s) 5 through the opening in the mixing bowl lid and the cover(s) 6 close the aperture(s) into the bowl.

The pump is activated and cleaning fluid sprayed around within the interior of the mixer bowl by the or each lance from the spray nozzle assembly on the end thereof.

On completion of the wash cycle the lance(s) is/are retracted and the actuator 11 is activated to pivot the flap 10 upwards and into its closed position. At the same time the bowl drain may be closed to seal the mixing bowl ready for next use.

The mixing machine controller provides a visual indication on the mixer control panel that the wash cycle has been completed and the mixing bowl is safe to be used and opened.

The preferred embodiment cleaning system shown in the drawing comprises two retractably mounted cleaning lances but in a larger mixer three or more cleaning lances may be provided while in a smaller mixer a single cleaning lance may be sufficient. The cleaning system of the invention has been described in relation to a bowl in which the kneading tool moves within the bowl about a horizontal axis and cleaning system of the invention may also be installed to mixers having a kneading tool which moves about a vertical axis or an angled axis. The cleaning lance(s) which are automatically inserted and retracted through an aperture in the top of the mixer and particularly through a lid over the mixing bowl may in an alternative embodiment insert at an angle through the mixer lid or through rather than through the lid, the bowl of the mixer, through an aperture over which a closure flap similar to that 10 normally operates.

We have found that the time taken to clean a mixing bowl can be reduced from at least 30 minutes when done manually to about 3 minutes, for a dual lance cleaning system. The table below shows the results of the tests undertaken to date.

|  | Single Lance System | Twin Lance System |
| --- | --- | --- |
| Bowl Clean Cycle Time | 6 minutes - standard clean<br>12 minutes - allergen clean | 3 minutes - standard clean<br>6 minutes - allergen clean |
| Water Usage per Cycle | 225 litres - standard clean<br>450 litres - allergen clean | 225 litres - standard clean<br>450 litres - allergen clean |

The foregoing describes the invention including a preferred form thereof. Alterations and modifications as would be obvious to those skilled in the art are intended to be incorporated within the scope hereof, as defined in the accompanying claims.

The invention claimed is:

1. A food mixer cleaning apparatus for cleaning the interior of a food mixing bowl of a food mixer comprising:
    a support structure for attachment to an exterior of a food mixer,
    an arm movably carried by said support structure,
    a cleaning lance carried by said arm,
    a spray nozzle assembly at an end of the lance,
    a first actuator operable to reciprocally move the arm on the support structure to insert or retract the lance into or out of a food mixing bowl through an aperture in the exterior of the food mixer,
    a pump operable to deliver cleaning fluid under pressure over a conduit to the lance and spray nozzle assembly, and
    a flap supported by the support structure and a second actuator, the flap arranged to close the aperture when the cleaning lance is retracted, the second actuator operable to open the flap to allow insertion and retraction of the lance into and from the bowl through said aperture.

2. A food mixer cleaning apparatus according to claim 1 including a cover around another end of the cleaning lance to close the aperture through which the lance is inserted into and retracted from the food mixing bowl.

3. A food mixer cleaning apparatus according to claim 1 also comprising a control system arranged to on initiation of a cleaning cycle cause opening of said flap, insertion of the cleaning lance into the food mixing bowl, and operation of a pump to deliver fluid under pressure to the spray nozzle assembly of the lance.

4. A food mixer cleaning apparatus according to claim 1 comprising spray nozzles arranged to rotate about an axis transverse to the length of the cleaning lance and an axis co-axial with or parallel to a longitudinal axis of the lance in operation.

5. A food mixer including an exterior and an integrated cleaning apparatus for cleaning the interior of a food mixing bowl comprising:
    a support structure attached to the exterior of the food mixer,
    an arm movably carried by said support structure,
    a cleaning lance carried by said arm,
    a spray nozzle assembly at an end of the lance, a first actuator operable to reciprocally move the arm on the support structure to insert or retract the lance into or out of the food mixing bowl through an aperture in the exterior of the food mixer, a pump operable to deliver cleaning fluid under pressure over a conduit to the lance and spray nozzle assembly, and a flap supported by the support structure and a second actuator, the flap arranged to close the aperture when the cleaning lance is retracted, the second actuator operable to open the flap to allow insertion and retraction of the lance into and from the bowl through said aperture.

6. A food mixer according to claim 5 including a cover around another end of the cleaning lance to close the aperture through which the lance is inserted into and retracted from the food mixing bowl.

7. A food mixer according to claim 5 also comprising a control system arranged to on initiation of a cleaning cycle cause opening of said flap, insertion of the cleaning lance into the food mixing bowl, and operation of a pump to deliver fluid under pressure to the spray nozzle assembly of the lance.

8. A food mixer according to claim 5 comprising spray nozzles arranged to rotate about an axis transverse to the length of the cleaning lance and an axis co-axial with or parallel to a longitudinal axis of the lance in operation.

9. A cleaning apparatus for cleaning the interior of a food mixing bowl of a food mixer including a lid comprising:
at least one support frame for attachment to a food mixing bowl,
a support arm slidingly engaged with said at least one support frame for supporting a bowl cleaning assembly, said bowl cleaning assembly including:
a substantially hollow elongate lance member attached to said support arm,
a cleaning head assembly rotatably engaged with said substantially hollow elongate lance member and located at a first end of said substantially hollow elongate lance member opposite said support arm, and
a conduit having a first end releasably connected to a second end of said substantially hollow elongate lance member,
at least one first actuator engaged with said at least one support frame and electrically connected to said support arm, said at least one first actuator operable to slide said support arm in a substantially vertical direction along said at least one support frame to insert or retract said substantially hollow elongate lance member into or out of said food mixing bowl through an aperture in the exterior of the food mixer,
a pump releasably connected to a second end of said conduit, said pump operable to provide a fluid at a pressure to said substantially hollow elongate lance member via said conduit to deliver a high pressure fluid output from said cleaning head assembly to clean said food mixing bowl when said substantially hollow elongate lance member is inserted in said food mixing bowl, and
a flap supported by the support frame and a second actuator, the flap arranged to close the aperture when the lance member is retracted, the second actuator operable to open the flap to allow insertion and retraction of the lance member into and from the bowl through said aperture.

10. A food mixer cleaning apparatus for cleaning the interior of a food mixing bowl of a food mixer comprising:
a support structure for attachment to an exterior of a food mixer,
an arm movably carried by said support structure,
a cleaning lance carried by said arm,
a spray nozzle assembly at an end of the lance,
an actuator operable to reciprocally move the arm on the support structure to insert or retract the lance into or out of a food mixing bowl through an aperture in the exterior of the food mixer, and
a flap supported by the support structure and a second actuator, the flap arranged to close the aperture when the cleaning lance is retracted, the second actuator operable to open the flap to allow insertion and retraction of the lance into and from the bowl through said aperture.

11. A food mixer cleaning apparatus according to claim 10 comprising a pump operable to deliver cleaning fluid under pressure over a conduit to the lance and spray nozzle assembly.

12. A food mixer cleaning apparatus according to claim 10 including a cover around another end of the cleaning lance to close the aperture through which the lance is inserted into and retracted from the food mixing bowl.

13. A food mixer cleaning apparatus according to claim 10 also comprising a control system arranged to on initiation of a cleaning cycle cause opening of said flap, insertion of the cleaning lance into the food mixing bowl, and operation of a pump to deliver fluid under pressure to the spray nozzle assembly of the lance.

14. A food mixer cleaning apparatus according to claim 10 comprising spray nozzles arranged to rotate about an axis transverse to the length of the cleaning lance and an axis co-axial with or parallel to a longitudinal axis of the lance in operation.

15. A food mixer including an exterior and an integrated cleaning apparatus for cleaning the interior of a food mixing bowl comprising:
a support structure attached to the exterior of the food mixer,
an arm movably carried by said support structure,
a cleaning lance carried by said arm,
a spray nozzle assembly at an end of the lance,
a first actuator operable to reciprocally move the arm on the support structure to insert or retract the lance into or out of the food mixing bowl through an aperture in the exterior of the food mixer, and
a flap supported by the support structure and a second actuator, the flap arranged to close the aperture when the cleaning lance is retracted, the second actuator operable to open the flap to allow insertion and retraction of the lance into and from the bowl through said aperture.

16. A food mixer according to claim 15 comprising a pump operable to deliver cleaning fluid under pressure over a conduit to the lance and spray nozzle assembly.

17. A food mixer according to claim 15 including a cover around another end of the cleaning lance to close the aperture through which the lance is inserted into and retracted from the food mixing bowl.

18. A food mixer according to claim 15 also comprising a control system arranged to on initiation of a cleaning cycle cause opening of said flap, insertion of the cleaning lance into the food mixing bowl, and operation of a pump to deliver fluid under pressure to the spray nozzle assembly of the lance.

19. A food mixer according to claim 15 comprising spray nozzles arranged to rotate about an axis transverse to the length of the cleaning lance and an axis co-axial with or parallel to a longitudinal axis of the lance in operation.

20. A food mixer according to claim 5 wherein the aperture is provided in a lid of the food mixing bowl.

* * * * *